United States Patent [19]

Lee

[11] Patent Number: 5,209,436
[45] Date of Patent: May 11, 1993

[54] RADIAL REEFING MEANS FOR USE IN PACKING AND OPENING A PARACHUTE CANOPY IN A CONTROLLED MANNER

[75] Inventor: Calvin K. Lee, Needham, Mass.
[73] Assignee: The United States of America as represented by the Secretary of the Army, Washington, D.C.
[21] Appl. No.: 860,653
[22] Filed: Mar. 30, 1992
[51] Int. Cl.$^5$ ............................................. B64D 17/36
[52] U.S. Cl. ............................................. 244/152
[58] Field of Search ....................................... 244/152
[56] References Cited

U.S. PATENT DOCUMENTS

| | | | |
|---|---|---|---|
| 2,384,127 | 9/1945 | Nailor | 244/152 |
| 2,610,008 | 9/1952 | Smith | 244/152 |
| 2,703,212 | 3/1955 | Heinrich | 244/152 |
| 2,736,524 | 2/1956 | Thebault | 244/152 |
| 2,929,589 | 3/1960 | Carter et al. | 244/152 |
| 2,980,371 | 4/1961 | Finney | 244/152 |
| 3,170,660 | 2/1965 | Kehlet | 244/152 |
| 3,245,639 | 4/1966 | Mitchell | 244/152 |
| 3,315,921 | 4/1967 | Riley et al. | |
| 3,385,539 | 5/1968 | Ewing et al. | 244/142 |
| 3,423,054 | 1/1969 | Stencel | 244/149 |
| 3,434,680 | 3/1969 | Ferguson | 244/142 |
| 3,452,631 | 7/1969 | Brizzolara | 244/152 |
| 3,756,547 | 9/1973 | Snyder et al. | 244/152 |
| 3,887,151 | 6/1975 | Matsuo | 244/150 |
| 4,117,994 | 10/1978 | Webb | 244/142 |
| 4,342,437 | 8/1982 | Farinacci | 244/137 R |
| 4,540,145 | 9/1985 | Matsuo | 244/152 |
| 4,623,109 | 11/1986 | Sadeck | 244/152 |
| 4,638,961 | 1/1987 | Rousseau | 244/142 |
| 4,699,338 | 10/1987 | Penberthy | 244/152 |
| 4,752,050 | 6/1988 | Johnson | 244/152 |
| 4,846,423 | 7/1989 | Reuter | 244/145 |
| 4,863,119 | 9/1989 | Case et al. | 244/152 |
| 4,927,099 | 5/1990 | Emerson et al. | 244/152 |
| 4,955,563 | 9/1990 | Lee et al. | 244/152 |

FOREIGN PATENT DOCUMENTS

| | | |
|---|---|---|
| 672583 | 3/1939 | Fed. Rep. of Germany ...... 244/152 |
| 918005 | 9/1954 | Fed. Rep. of Germany . |
| 1410563 | 9/1964 | France . |
| 2514724 | 4/1983 | France . |

OTHER PUBLICATIONS

Elsa J. Hennings, "RAPID-The Design of a Low Altitude Parachute," presented at the 11th AIAA Aerodynamic Decelerator Systems Technology Conference, San Diego, Calif. (Apr. 9-11, 1991).

Steven M. Hintzke, "Aerodynamic decelerators," Aerospace America (Dec. 1991).

Technical Manual: Organizational and DS Maintenance Manual Including Repair Parts and Special Tools List for Parachute, Cargo Types, pp. 1-4, 1-7, 1-9, and 1-24 through 1-26, Headquarters, Dept. of Army Dec. 7, 1973.

Dan Poynter, The Parachute Manual, pp. 266, 267, 274, and 305.

Primary Examiner—Galen Barefoot
Attorney, Agent, or Firm—Richard J. Donahue; Anthony T. Lane

[57] ABSTRACT

A parachute having radial reefing means for use in packing and opening the parachute canopy in a controlled manner. The parachute includes a circular canopy having a peripheral skirt and a plurality of evenly spaced radials. Suspension lines are attached at one end to the skirt at each radial and are bound together at the opposite end in a bundle. Identical sets of at least three reefing rings are attached to each of selected, non-adjacent radials, i.e., reefing radials, which are evenly spaced apart by a distance approximately equal to 25% to 40% of the length of a radial. The outermost reefing ring of each set is attached to its respective reefing radial at the skirt, and the remaining reefing rings of each set are evenly spaced apart by not more than about 2 feet over about 25% to 40% of the length of the reefing radial. A reefing line is attached to each reefing radial at the skirt, is threaded through its respective set of reefing rings, and is bound to the other reefing lines in a bundle which is suspended over the bundle of suspension lines. To reef the parachute canopy, the bundle of reefing lines is pulled downwardly and tied together with the bundle of suspension lines. During the initial stages of deployment, the canopy remains reefed, causing small air pockets to form in the lower part of the canopy. Later, at an appropriate time, a cutter disreefs the canopy, allowing the upper part of the canopy to be inflated.

2 Claims, 6 Drawing Sheets

RADIAL REEFING MEANS FOR USE IN PACKING AND OPENING A PARACHUTE CANOPY IN A CONTROLLED MANNER

The invention described herein may be manufactured, used and licensed by or for the Government for Governmental purposes without the payment to us of any royalty thereon.

BACKGROUND OF THE INVENTION

The present invention relates generally to parachutes and more particularly to parachutes which include a reefing mechanism for use in packing and opening the parachute canopy in a controlled manner.

Parachutes are well-known devices used by, among others, the military to safely airdrop cargo and/or personnel from what would otherwise be excessively high altitudes. One type of parachute comprises a generally circularly shaped canopy, the canopy having an outer periphery referred to as a "skirt" or a "mouth" and optionally having an apical opening referred to as a "vent." In addition, the canopy typically includes a plurality of regularly spaced seams referred to as "radials" which extend radially from the vent to the skirt and which partition the canopy into sections referred to as "gores." Suspension lines are attached at one end to the skirt at each of the radials and are bound together at the other end at a confluence point which is adapted for attachment to the payload.

As can readily be appreciated, parachute canopies must be capable of being packed in a condition ready for deployment when not in use and of being opened in a controlled yet rapid manner when in flight and exposed to the surrounding air flow field. To meet both of these objectives, various structural adaptations to parachutes have been devised which cause the parachute canopy to respond to exposure to the surrounding flow field in different ways. Such adaptations have included techniques commonly referred to as skirt-reefing, pull-down center line, crown chute, and secondary parachute at skirt.

In "RAPID—The Design of a Low Altitude Parachute," by Elsa J. Hennings, presented at the 11th AIAA Aerodynamic Decelerator Systems Technology Conference, San Diego, CA (Apr. 9-11, 1991), a unique deployment/reefing system for a parachute is described. The system involves packing the parachute with the skirt pulled up to a concentric band located one-third of the way down the gore from the vent. This is accomplished by attaching internal lines that run from each skirt-radial joint through rings at each concentric band-radial joint and in to a single reefing webbing. When this reefing webbing is pulled completely down so that the skirt is drawn up to the concentric band, the drag area of the parachute is very small. The smaller the drag area, the faster the parachute inflates; therefore the parachute opens very quickly when deployed in this configuration. The reefing webbing is designed to be attached to a device that will let it pay out, allowing the parachute to inflate until a preset maximum drag force is reached. When that force is reached, the webbing is locked in place, which stops the inflation process. When the velocity decays, the drag force will drop below the preset maximum force, so more webbing will be let out, allowing additional inflation. This sequence continues until the parachute is fully inflated. In the low speed case, the maximum force would not be reached, so the reefing webbing would pay out completely upon parachute deployment.

The skirt, which initially opens to the diameter of the concentric band (not completely shut as in normal deployment), drops straight down and is inflated very quickly. At low speeds, this system allows for a very fast opening, while at high speeds, the reefing webbing controls the inflation, keeping the opening force from exceeding human tolerance. Unlike the pull-down line technique, this deployment method causes the opening loads to be highest at the vent, which is designed to withstand such forces. In addition to the controllable reefing webbing, slots at each radial seam running from the skirt to the concentric band act to automatically reduce excessive forces by opening when the pressure inside the parachute is high (during the inflation process) and closing when the pressure drops (during steady state descent). This results in the maximum drag area (slots closed) when it is needed most, i.e., when the parachute is close to the ground.

SUMMARY OF THE INVENTION

It is an object of the present invention to provide a parachute having a new and improved reefing system for use in packing and opening the parachute canopy in a controlled manner.

In accordance with the purpose of the invention as stated above, a parachute constructed according to the teachings of the present invention is provided which comprises a generally circularly shaped canopy. The canopy includes a peripheral skirt and a plurality of radials extending outwardly at equally spaced intervals towards said skirt. The parachute also includes a plurality of suspension lines, each of which is attached at one end to said skirt at a radial and is joined at the opposite end in a bundle at a first confluence point, the bundle of lines at the first confluence point being attachable to a payload.

In addition, the parachute of the present invention also includes radial reefing means. The radial reefing means of the present invention includes at least three rings attached to the underside of the canopy on each of selected, non-consecutive radials, i.e., reefing radials, the reefing radials being equally spaced apart by a distance corresponding generally to about 25% to 40% of the length of a radial. One of each set of at least three rings is attached to a corresponding reefing radial at the skirt and the remaining rings of each set of at least three rings are attached to the reefing radial at equally spaced intervals not exceeding about 2 feet over a total distance of about 25% to 40% of the length of the radial.

The radial reefing means of the present invention also includes a plurality of reefing lines each of which is attached at one end to the skirt at a reefed radial, is threaded through a corresponding set of reefing rings attached to the reefed radial, and is joined at the opposite end in a bundle at a second confluence point, the bundle of lines at the second confluence point being adapted to be drawn so as to cause the parachute canopy to be radially reefed. The radial reefing means of the present invention further includes means for disreefing the parachute canopy at an appropriate period of time after it has been radially reefed.

As will be seen below, one benefit to the radial reefing means of the present invention is that excess canopy is puckered during early opening, thereby eliminating canopy enfloding of large cargo parachutes.

Another benefit of the radial reefing means of the present invention is that a large and stiff canopy mouth is formed during canopy snatch, thereby allowing early and positive canopy inflation.

Still another benefit of the radial reefing means of the present invention is that the overall canopy inflation is a controlled two-stage opening, thereby avoiding a sharp and excessively high peak opening force.

Additional objects, features, and advantages of the present invention will be set forth in part in the description which follows and in part will be obvious from the description or may be learned by practice of the invention. The objects, features, and advantages of the present invention also may be realized and attained by means of the instrumentalities and combinations particularly pointed out in the appended claims.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
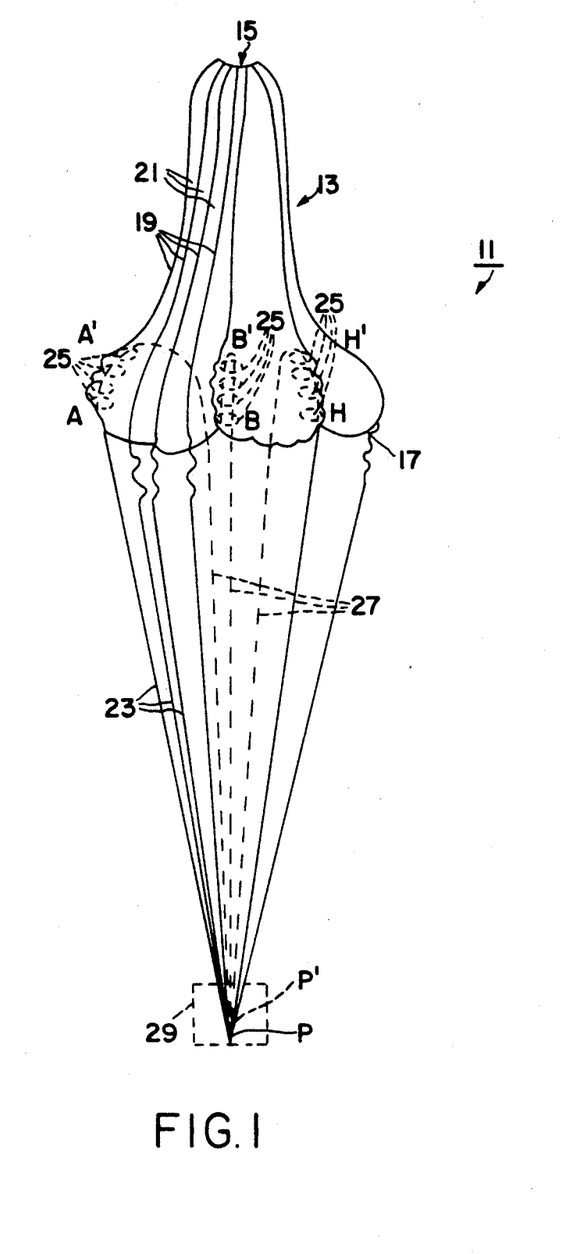
FIG. 1 is a simplified side view of one embodiment of a parachute constructed according to the teachings of the present invention, the parachute being shown in the reefed position.

Referring now to the drawings and more particularly to FIG. 1, there is shown a simplified view of one embodiment of a parachute constructed according to the teachings of the present invention, the parachute being represented generally by reference numeral 11.

Parachute 11 comprises a generally circular canopy 13. Canopy 13 includes an apical vent 15, a peripheral skirt 17, and a plurality of evenly spaced radials 19 which define a plurality of equally sized gores 21. (For purposes of clarity and simplicity, only certain radials 19 of canopy 13 are shown.)

Parachute 11 also includes a plurality of suspension lines 23, each of which is attached at one end to skirt 17 at a respective radial 19 and is joined at the opposite end in a bundle to the other suspension lines at a first confluence point P. (For purposes of clarity and simplicity, only certain suspension lines 23 are shown.)

Figure 2:
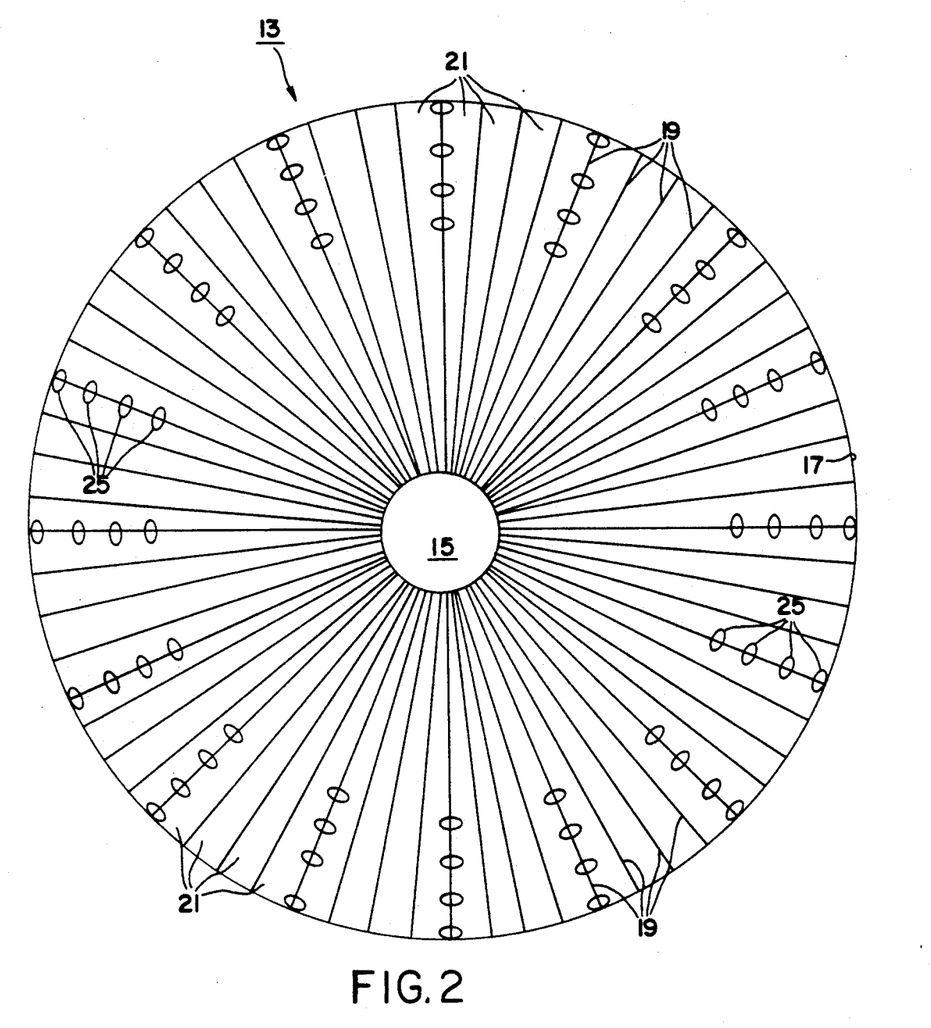
FIG. 2 is a schematic representation showing the placement of reefing rings on the parachute canopy of FIG. 1.

Parachute 11 further includes radial reefing means which, as will be seen below, are used to pack and to open canopy 13 in a controlled manner. The radial reefing means of the present invention comprises a plurality of reefing rings 25, rings 25 being attached in sets of at least three to selected non-consecutive radials (also referred to in the present specification and claims as "reefing radials") on the underside of canopy 13 (see also FIG. 2). The appropriate number of reefing rings 25 attached to each reefing radial is dependent upon the following factors. First, the reefing rings 25 on each reefing radial must be evenly spaced over a distance of about 25% to 40% of the length thereof with the outermost reefing ring being attached to the reefing radial at the skirt 17. (The percentage of the length of a reefing radial over which reefing rings 25 are attached is referred to as the "reefing ratio" or the "percentage reefed.") Second, the distance between adjacent reefing rings 25 on a single reefing radial must not exceed about 2 feet. The determination of which radials 19 will be selected for use as reefing radials also depends on certain factors. First, as noted above, reefing radials must be non-consecutive. Second, the space between adjacent reefing radials must be the same over the entire surface of canopy 13 and must be approximately equal to about 25% to 40% of the length of a radial.

To illustrate the above principles, if a 64-foot diameter, 64-gore standard Army G12 cargo parachute were to be reefed 25% according to the teachings of the present invention, one suitable approach would be to attach 5 reefing rings, spaced apart by 2 feet, to every fourth radial (resulting in 16 reefing radials).

The radial reefing means of the present invention also includes a plurality of reefing lines 27, each of which is attached at one end to a reefed radial at skirt 17, is threaded through a corresponding set of rings 25 attached to the reefed radial, and is joined at the opposite end in a bundle at a second confluence point P'. The bundle of reefing lines 27 at second confluence point P' is adapted to be pulled downwardly and coupled to the bundle of suspension lines 23 at first confluence point P so as to cause canopy 13 to be radially reefed as shown. As can be seen, when canopy 13 is radially reefed in the present manner, that portion of the canopy fabric extending from the outermost ring (e.g., points A, B, and H) to the innermost ring (e.g., points A', B', and H') becomes puckered. In addition, because of the radial reefing, some slack is applied to those suspension lines which are not connected to reefing radials.

The radial reefing means of the present invention further includes a conventional timed pyrotechnic cutter 29 (or similar device), which holds together the respective bundles of suspension lines 23 and reefing lines 27 until the appropriate time for disreefing. To enhance the effect of radial reefing, a canopy tie line (not shown), which is adapted to break during initial canopy inflation, may be used to tie canopy 13 a few feet above the innermost reefing ring. Once reefed in the manner described above, parachute 11 may be packed in a deployment bag using standard procedures.

Figure 3:
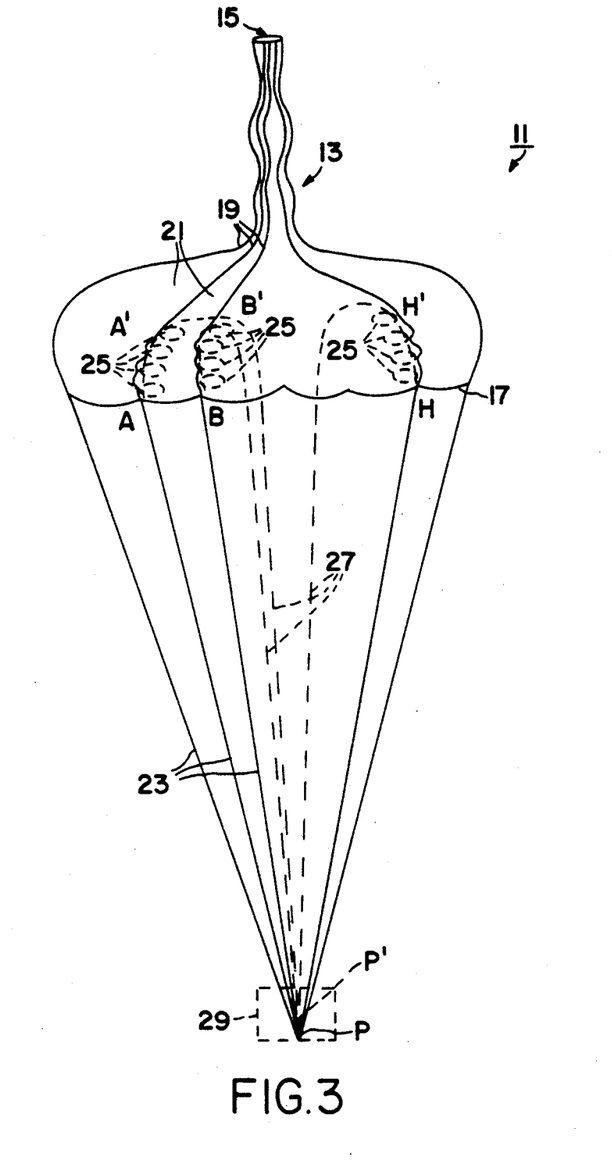
FIG. 3 is a simplified side view of the parachute shown in FIG. 1 as it appears during canopy snatch.
Figure 4:
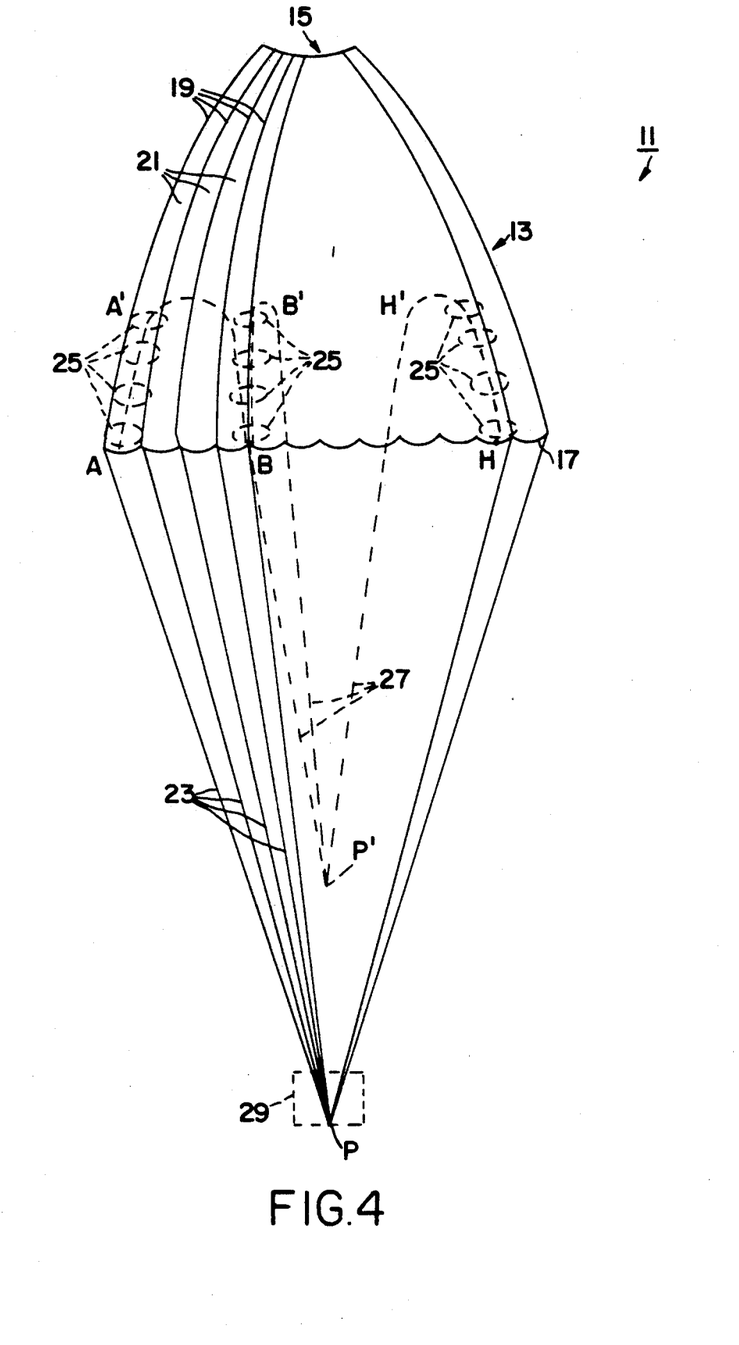
FIG. 4 is a simplified side view of the parachute shown in FIG. 1 as it appears in the disreefed position.

As mentioned earlier, the principal objects of radial reefing include the avoidance of canopy enfolding and the formation of a large, stiff canopy mouth during canopy snatch (i.e., when the canopy is positioned horizontally and is therefore subjected to a substantially one-dimensional air flow) to permit a two-stage opening that avoids a high peak opening force. By radial reefing selected radials in accordance with the teachings of the present invention, it has been found that a considerable amount of canopy fabric becomes puckered, thereby decreasing the amount of excess canopy fabric available during early inflation and avoiding canopy enfolding. Moreover, because there is at least one non-reefed radial and at least two associated gores between every two adjacent reefed radials, as soon as the lower part of the canopy is exposed to an incoming air stream during canopy snatch, a fabric pocket near the skirt is formed by the gores between adjacent reefed radials. The looseness of certain suspension lines near the skirt and the presence of the canopy tie line, if one is used, enhance the formation of these pockets. Cumulatively, the pockets form a large stiff mouth for efficient air flow and early positive canopy inflation (see FIG. 3). By increasing the reefing ratio, the size of the mouth opening and its formation rate can be increased, thereby decreasing inflation time. Alternatively, the formation of fabric pockets may be influenced by altering the number of gores between adjacent reefed radials. Once the large stiff mouth is formed and the canopy is well inflated, the canopy can be disreefed by firing the pyrotechnic cutter, thereby permitting the upper portion of the canopy to be inflated (see FIG. 4).

The radial reefing technique described above was first investigated using scale model parachutes and was ultimately verified by full-scale testing using Army G12 and G11 cargo parachutes and T10 personnel parachutes. Some of the results of this full-scale testing are described below.

Figure 5:
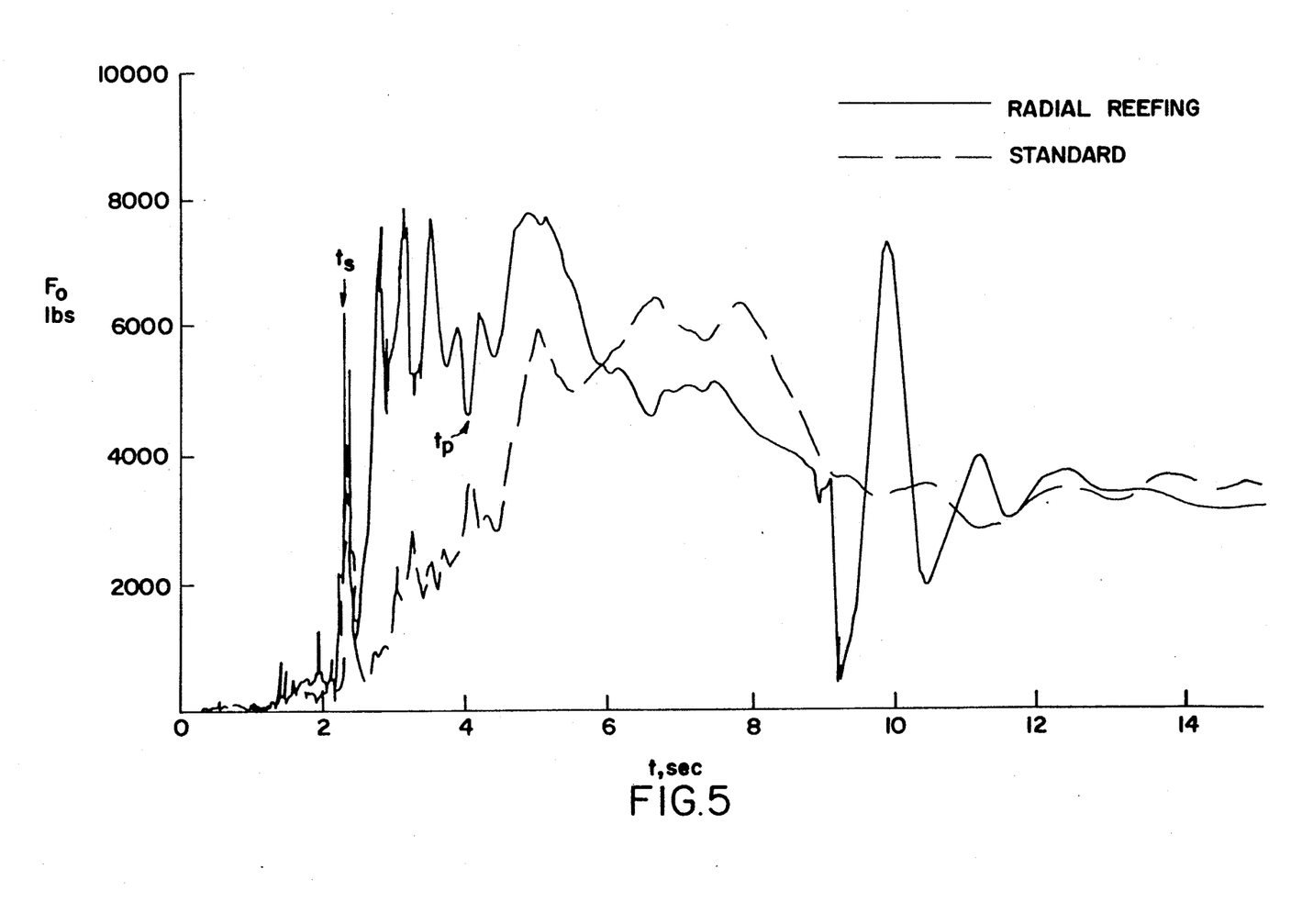
FIG. 5 is a graphic comparison of the opening forces experienced by a standard Army 100-foot diameter G11 cargo parachute and by a G11 cargo parachute that has been radially reefed 25% in accordance with the teachings of the present invention.

When a G11 parachute was radially reefed 25% in accordance with the teachings of the present invention, a large stiff mouth for early and positive canopy inflation was formed at canopy snatch. Moreover, after the large, stiff mouth was formed, the canopy continued to inflate rapidly and positively. In contrast, a standard G11 parachute was hardly inflated at all at canopy snatch. A comparison of the respective openings for the standard G11 parachute and the radially reefed G11 parachute is quantitatively shown in FIG. 5, which depicts the measured opening force for each parachute over time. The fast and early opening of the radially reefed G11 parachute is clearly shown by the rapid rise in force which was measured immediately after canopy snatch (at time $t_s$); in contrast, the rise in force for the standard G11 parachute was measured at a much later time. The decrease and increase of force experienced by the radially reefed G11 parachute between $t=9-10$ seconds corresponds to the disreefing of the canopy. For this parachute test, the reefing time was too long. Disreefing at $t=6$ seconds should further shorten the opening time of the radially reefed G11.

Figure 6:
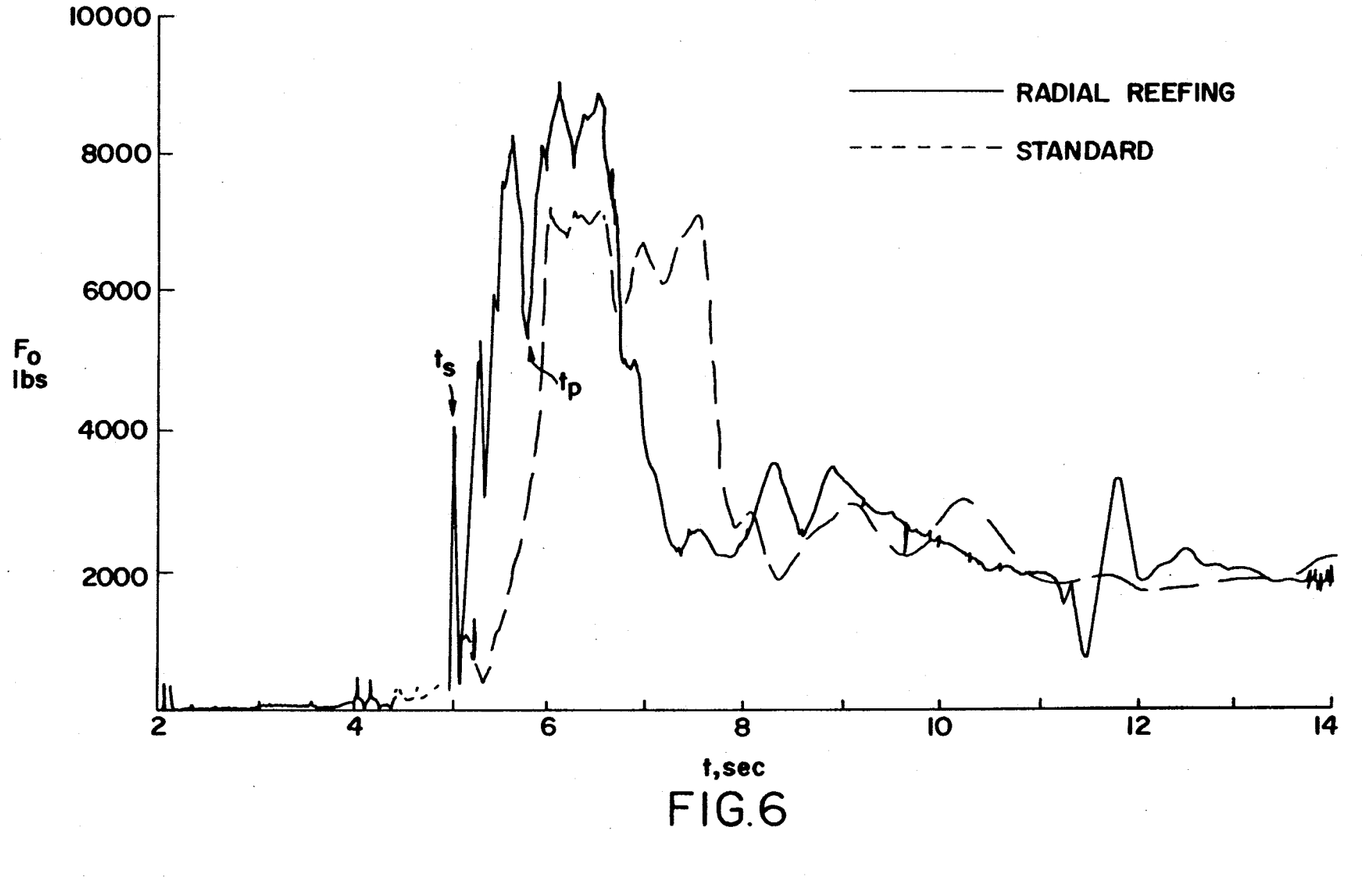
FIG. 6 is a graphic comparison of the opening forces experienced by a standard Army 64-foot diameter G12 cargo parachute and by a G12 cargo parachute that has been radially reefed 25% in accordance with the teachings of the present invention.

When the radial reefing technique of the present invention was also applied to a G12 cargo parachute and a 35-foot diameter T10 personnel parachute, a large, stiff mouth was formed at canopy snatch for each. FIG. 6 shows the difference in force experienced by a standard G12 parachute and a G12 parachute that was radially reefed 25%. As can be seen from FIG. 6, the radially reefed G12 parachute had an accelerated opening and a shorter inflation time than the standard G12 parachute. Tests were also conducted for G12 and T10 parachutes which were radially reefed 40% and 50%. The overall openings for the 40% and 50% radially reefed parachutes were similar to those for the 25% radially reefed parachutes except that the 40% and 50% radially reefed parachutes had a more accelerated opening than anticipated. Because of the accelerated opening, the altitude loss for full opening of the 40% radially reefed T10 parachute was 210 feet, as compared to 300 feet for a standard T10 parachute.

As expected, because the opening times for radially reefed G11 and G12 parachutes are shorter than those for standard G11 and G12 parachutes, the peak opening forces for radially reefed G11 and G12 parachutes are higher than those for standard G11 and G12 parachutes. Examination of the measured opening force profiles and of high speed movies comparing the opening of the respective parachutes reveals that the opening of radially reefed parachutes is not explosive like some other accelerated opening methods that result in a sharp high peak $F_o$. The formation of the fabric pockets and the time duration of the large, stiff mouth correspond to the time interval between time $=t_s$ and time $=t_p$. After time $t_p$, the pockets begin to separate from one another, allowing the upper part of the canopy to inflate. This is indicated in the rise in $F_o$ after $t_p$. The overall opening is thus an accelerated and controlled two-stage opening, avoiding an undesirable single sharp peak opening force. The avoidance of a sharp peak opening force is particularly important for personnel parachutes.

The embodiments of the present invention described above are intended to be merely exemplary and those skilled in the art shall be able to make numerous variations and modifications to it without departing from the spirit of the present invention. For example, whereas the above description is directed to single parachutes, the teachings of the present invention are also applicable to clustered parachutes. All such variations and modifications are intended to be within the scope of the present invention as defined by the appended claims.

What is claimed is:

1. A parachute for the controlled airdrop of a payload comprising:
   a) a canopy of generally circular shape, said canopy having a peripheral skirt and a plurality of radials spaced evenly apart;
   b) a plurality of suspension lines, each of which is attached at one end to said skirt at a radial and is joined at the opposite end in a bundle, said bundle of suspension lines being attachable to the payload; and
   c) radial reefing means for use in packing and opening said canopy in a controlled manner, said radial reefing means comprising
      i) a plurality of sets of at least three reefing rings, said sets being attached only to non-adjacent radials evenly spaced apart by a distance equal to about 25% to about 40% of the length of a radial, one reefing ring of each set being attached to its respective radial at said skirt and the remaining reefing rings of each set being evenly spaced apart by not more than about 2 feet over about 25% to about 40% of the length of a radial,
      ii) a plurality of reefing lines, each of which is attached at one end to said skirt at a radial to which a set of at least three reefing rings is attached, is threaded through its corresponding set of at least three reefing rings, and is joined at the opposite end in a bundle, said bundle of reefing lines being positioned over said bundle of suspension lines and being adapted to be pulled downwardly and coupled to said bundle of suspension lines in such a way as to cause said canopy to be radially reefed at said radials to which said sets of reefing rings are attached by the distance over which said reefing rings are spaced, and
      iii) means for decoupling said bundle of reefing lines from said bundle of suspension lines at an appropriate time so as to cause said canopy to be disreefed.

2. The parachute as claimed in claim 1 wherein said canopy is 64 feet in diameter and has 64 radials and wherein said radial reefing means comprises 16 sets of reefing rings attached only to every fourth radial, each set of reefing rings being made up of five reefing rings spaced apart by two feet.

* * * * *